Dec. 24, 1929.　　　　F. H. CUMMER　　　　1,741,013
MIXER FOR ROAD MATERIALS
Filed Aug. 6, 1928
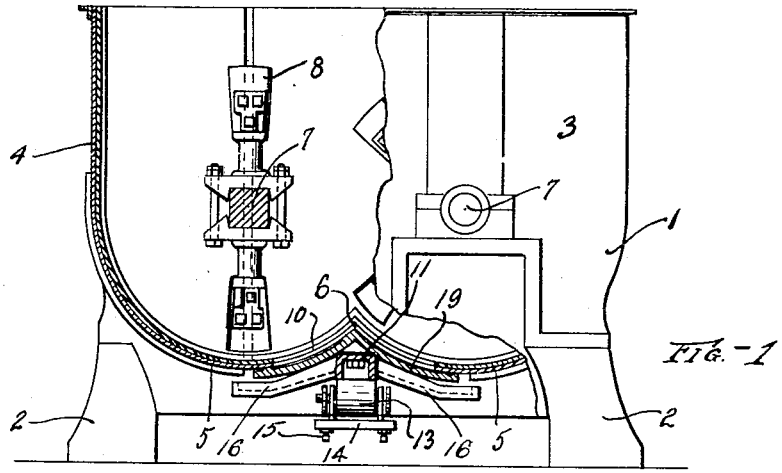
Fig.-1
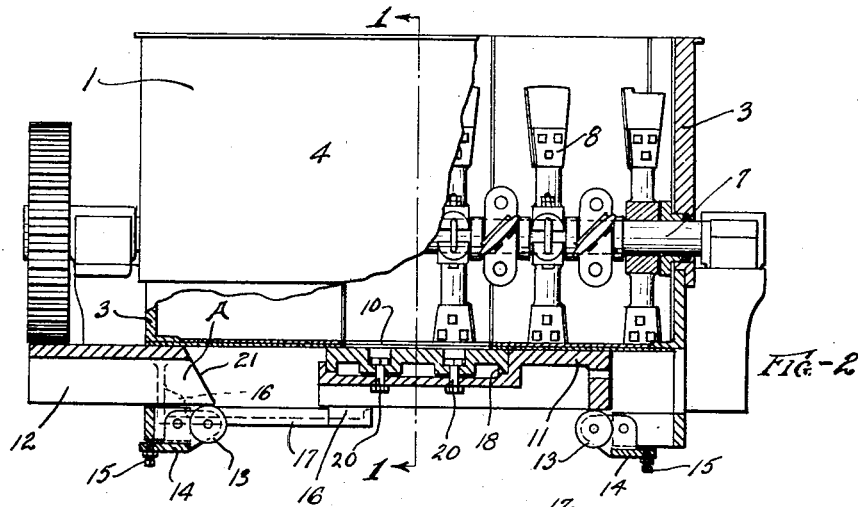
Fig.-2
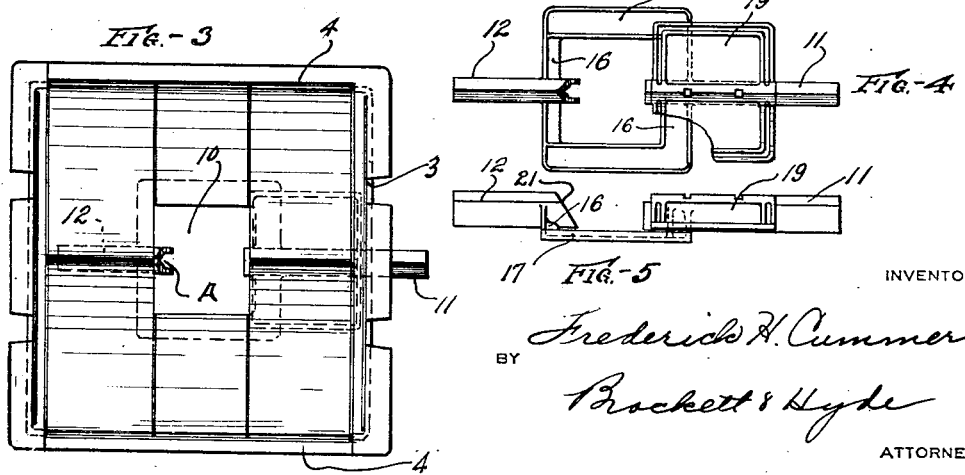
Fig.-3
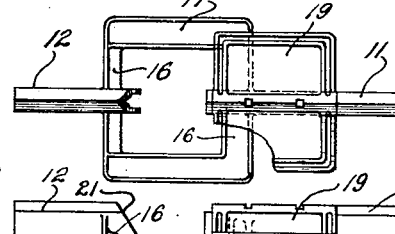
Fig.-4
Fig.-5
INVENTOR
Frederick H. Cummer
BY Brockett & Hyde
ATTORNEYS Patented Dec. 24, 1929

1,741,013

UNITED STATES PATENT OFFICE

FREDERICK H. CUMMER, OF LOS ANGELES, CALIFORNIA

MIXER FOR ROAD MATERIALS

Application filed August 6, 1928. Serial No. 297,599.

This invention relates to mixers for road materials, and particularly to the valve mechanism therefor. The object of the invention is to provide improved valve mechanism in which a free, clear and unobstructed discharge opening is supplied when the valve is in open position, but the valve nevertheless is properly supported and guided in its travel from open to closed position and return, and which valve is of simple construction, is conveniently operated, and may be readily applied as a substitute for the valves in mixers already in use without material modification thereof.

A further object of the invention is to provide valve mechanism of this kind in which the valve is detachably connected to the carrier or operator therefor and may be made of more expensive wear resisting material.

Further objects of the invention are in part obvious and in part will appear more in detail hereinafter.

In the drawings, which represent one embodiment of the invention, Fig. 1 is in part an end view and in part a transverse sectional elevation on approximately the line 1—1, Fig. 2; Fig. 2 is a side elevation partly broken out and in longitudinal central section to show interior parts; Fig. 3 is a plan view, the beaters and shafts being omitted; Fig. 4 is a plan view of the valve and carrier; and Fig. 5 is a side elevation thereof.

The invention is an improvement upon the mixer shown, described and claimed in my Patent No. 1,687,660, October 16, 1928, to which reference may be had for a more complete description if desired. Briefly described, the mixer comprises an outer shell or casing 1 open at its top and mounted upon supporting legs 2, the end walls 3 and side walls 4 being vertical, with the side walls merging into curved bottom wall portions 5, each of cylindrical form, the two cylindrical bottom surfaces joining at the center in a longitudinally extending peak 6 of inverted V-form. The two cylindrical portions of the mixer bottom are respectively curved about the centers of the two shafts 7, each of which carries a series of beater arms 8, the beaters on the two arms being arranged to pass each other without interference although their zones of motion overlap. By rotating the two shafts road material in the mixer is thoroughly mixed up preparatory to being delivered for use upon a roadway.

In the bottom of the mixer is a discharge opening 10 of rectangular form in plan view, as shown in Fig. 3 and through which material is discharged for delivery to the place of use. The opening is closed by valve means movable to open and closed positions to discharge or hold the material in the mixer. Generally speaking the valve means is of the same type shown in said patent, comprising a gate or valve member of generally rectangular shape in plan view, but a little larger than the opening, to close the same when brought beneath it, and which, of course, is of inverted V-form when viewed in end elevation, to conform to the shape of the mixer bottom. This valve is moved endwise or lengthwise of the bottom ridge of the mixer for its opening and closing movement. It is supported upon a carrier connected to a suitable actuator of the kind described in my patent referred to, and the carrier is made of special form so as to provide a full and clear opening in open valve position. The carrier comprises a framework including two alined end bars 11, 12 each of which rides upon one or more adjustable rollers 13 beneath it, said rollers being mounted upon pivoted brackets 14 adjustable by screws 15 to adjust the valve more or less closely to its seat and take up wear. The two end bars 11 and 12 are connected by a rectangular frame, including the cross members 16 and longitudinal members 17, which lie outside of the edges of the discharge opening so that they are not exposed through the same when the valve is moved to open position, as in Fig. 3. Preferably, the end bars 11, 12, cross bars 16 and longitudinal bars 17 are made parts of the same casting, although the carrier including these parts may be made up of structural members secured together in other ways. One of the end bars, such as bar 11, is recessed, as at 18, to provide a seat for the saddle-like valve member 19, which straddles the bar and is detachably secured thereto by the bolts 20.

With this arrangement the valve may be made of one of the better grades of wear resisting material, such as manganese steel, and the carrier frame may be made of a cheaper material, so that the valve may be replaced without the cost of replacing the whole frame. Of course, each one of the bars 11, 12 rides upon its own rollers and each bar is of such length and the rollers are so placed that both bars have bearing upon the rollers throughout the full extent of travel of the valve from open to closed position. In most cases it is possible to place the rollers so that in open valve position the discharge opening is completely free and unobstructed, but in adapting the valve to mixers already in use, such as of the form shown in my prior application, it may be necessary to permit some extension of the end of one or both of the bars into the opening, as indicated at A, Figs. 2 and 3, in which case the projecting bar end is bevelled off at 21 to assist downward flow of material being discharged.

The arrangement shown and claimed herein does away with the necessity of having the bar or bars of the supporting carrier extend across and bisect the discharge opening in open valve position, but the carrier frame extends around the opening and leaves the same free and unobstructed. Experience shows that this means a 20% increase in the rate of discharge of a load, so that any additional cost of replacement of these new parts for the old ones is quickly made up by more rapid operation of the whole asphalt plant, of which the mixer forms a very small part. More rapid duty of an expensive plant increases the return from the investment and obviously is an important advantage in a device of this kind.

What I claim is:

1. A mixer for road materials, comprising a receptacle provided with a bottom discharge opening, a carrier movable back and forth beneath the receptacle bottom and having an open rectangular frame surrounding said opening in open valve position and end bars connected to said frame and guided to travel along the receptacle, and a valve member carried by one of said bars and movable with the carrier to a position closing said opening.

2. A mixer of the character described in claim 1, in which the bottom of said receptacle is of inverted V-form, said valve member being of saddle like form straddling said bar and detachably connected thereto, and said valve member being endwise beyond the opening in said rectangular frame.

In testimony whereof I hereby affix my signature.

FREDERICK H. CUMMER.